United States Patent [19]

Lesko et al.

[11] Patent Number: 5,739,247

[45] Date of Patent: Apr. 14, 1998

[54] PRODUCTION OF STRUCTURAL REACTION INJECTION MOLDED POLYURETHANE PRODUCTS OF HIGH FLEX MODULUS AND HIGH ELONGATION

[75] Inventors: Merle W. Lesko, McDonald; Kristen L. Parks, Wexford, both of Pa.

[73] Assignee: Bayer Corporation, Pittsburgh, Pa.

[21] Appl. No.: 689,201

[22] Filed: Aug. 5, 1996

[51] Int. Cl.$^6$ .................................. C08G 18/10
[52] U.S. Cl. ............................ 528/60; 528/77
[58] Field of Search .......................... 528/60, 77

[56] References Cited

U.S. PATENT DOCUMENTS

| | | | |
|---|---|---|---|
| Re. 33,609 | 6/1991 | Nodelman | 264/53 |
| 4,065,410 | 12/1977 | Schäfer et al. | 260/2.5 AM |
| 4,218,543 | 8/1980 | Weber et al. | 521/51 |
| 4,269,945 | 5/1981 | Vanderhider et al. | 521/159 |
| 4,341,875 | 7/1982 | Visger et al. | 521/164 |
| 4,385,133 | 5/1983 | Alberino et al. | 521/159 |
| 4,435,349 | 3/1984 | Dominquez et al. | 264/257 |
| 4,442,235 | 4/1984 | Taylor et al. | 521/122 |

OTHER PUBLICATIONS

Journal of Cellular Plastics, Sep./Oct. 1981, pp. 268–273.

*Primary Examiner*—Rachel Gorr
*Attorney, Agent, or Firm*—Joseph C. Gil; Noland J. Cheung

[57] ABSTRACT

The present invention is directed to the production of molded polyurethane products having high flexural moduli (i.e. 1,000,000 psi or more) and high elongation wherein a reaction mixture is reacted in a closed mold. The reaction mixture comprises reacting a liquid, room temperature stable, isocyanate prepolymer with at least two hydroxy-functional polyethers having average hydroxyl functionalities of from 1.5 to 8 and number average molecular weights of from 350 to 1800, at least one hydroxyl functional organic material containing from 2 to 8 hydroxyl groups and having a number average molecular weight below 350 and at least two hydroxyl functional organic materials having average hydroxy functionalities of from 1.5 to 3 and having number average molecular weights of 4000 or more. The products are prepared from these processes using such specified isocyanate prepolymers and polyol blends.

2 Claims, No Drawings

PRODUCTION OF STRUCTURAL REACTION INJECTION MOLDED POLYURETHANE PRODUCTS OF HIGH FLEX MODULUS AND HIGH ELONGATION

BACKGROUND OF THE INVENTION

Reaction injection molding (RIM) has become an important process for the manufacture of a wide variety of moldings. The RIM process is a so-called "one-shot" process which involves the intimate mixing of a polyisocyanate component and an isocyanate reactive component followed by the injection (generally under high pressure) of the mixture into a mold with subsequent rapid curing. The polyisocyanate component is generally a liquid isocyanate. The isocyanate-reactive component generally contains a high molecular weight isocyanate-reactive component (generally a polyol) and usually contains a chain extender or cross-linker containing amine or hydroxyl groups. U.S. Pat. No. 4,218,543 describes one particularly commercially significant RIM system, which requires the use of a specific type of aromatic amine as a cross-linker/chain extender. Formulations based on such aromatic amines are generally restricted to the lower flexural modulus range (i.e., less than about 70,000 psi at room temperature). While it is known to use DETDA in combination with other co-chain extenders in order to increase the flexural modulus of the resultant molding, the use of such co-chain extender generally adversely affects the thermal properties of the resultant part.

The art has looked to various techniques for enhancing the flexural modulus of a RIM part, including use of different aromatic amines (see, e.g. U.S. Pat. No. 4,442,235), use of an aliphatic amine co-chain extender (see, e.g. U.S. Pat. No. 4,269,945), and the use of reinforcements such as fibers, particulate fillers, flakes and reinforcing mats (see, e.g., Journal of Cellular Plastics, September/October 1981, pages 268–273, and U.S. Pat. No. 4,435,349).

The '349 patent describes the use of a reaction mixture of a polyisocyanate, a polyol having an equivalent weight above 500, a relatively low molecular weight chain extender (such as ethylene glycol), and a delayed action catalyst. The reinforced products described in the examples are reported as having flex moduli as high as about 940,000 psi (about 6500 MPa).

U.S. Pat. No. 4,065,410 describes a RIM process wherein the reaction mixture comprises a polyisocyanate, a polyol having a molecular weight of from 1800 to 10,000, a blowing agent, and a chain extender mixture comprising ethylene glycol and another polyol having a molecular weight below 1800. As disclosed in the '410 patent the chain extender mixture comprises from 10 to 30% by weight based on the weight of the high molecular polyol. The products are described as having relatively low flexural moduli. A similar system (with similarly low flex moduli) is described in U.S. Pat. No. 4,341,875.

U.S. Pat. No. 4,385,133 describes a system which the reference characterizes as having high impact strength and high modulus, although the highest room temperature modulus reported is only around 220,000 psi (about 1520 MPa).

Finally, U.S. Reissue Pat. No. 33,609 describes the production of a high modulus product by using a specific compatible polyol blend. The reinforced products have flex moduli in excess of 600,000 psi (about 4150 MPa).

All of the various efforts to prepare high modulus products (i.e., products having room temperature flex moduli of 1,000,000 psi (about 6900 MPa) or higher) have resulted in products having relatively low elongation properties, which generally means that such products can not be used in automotive applications requiring some degree of flexibility (such as, e.g., automotive bumpers).

DESCRIPTION OF THE INVENTION

The present invention is directed to a process for the production of polyurethane moldings having high flex moduli and relatively high elongations by reacting a reaction mixture comprising a) a liquid, room temperature stable, polyisocyanate having an isocyanate group content of from 15 to 25% by weight, and having been prepared by reacting:
  1) an isocyanate mixture comprising:
    i) from 80 to 95% by weight of 4,4'-diphenylmethane diisocyanate,
    ii) from 2 to 7% by weight of 2,4'-diphenylmethane diisocyanate, and
    iii) an amount of an isocyanate containing higher oligomers of diphenylmethane diisocyanate having an isocyanate functionality of more than 2, such that isocyanate mixture 1) has an average isocyanate functionality of from 2.02 to 2.50, and
  2) a polyol mixture comprising:
    i) one or more diols having molecular weights of from 1000 to 5000, and
    ii) one or more triols having molecular weights of from 1000 to 6000, wherein the weight ratio of diol to triol is from 10:1 to 1:10, b) at least two hydroxy-functional polyethers having average hydroxyl functionalities of from 1.5 to 8 and number average molecular weights of from 350 to below 1800, with the average hydroxyl functionality of component b) being from about 2 to about 4 and with the average molecular weight of component b) being from about 350 to about 500, c) at least one hydroxyl functional organic material containing from 2 to 8 hydroxyl groups and having a number average molecular weight below 350, wherein components b) and c) are used in a weight ratio of from about 10:1 to about 1:1, and d) from 45 to 60% by weight, based upon the total amount of components b), c) and d) of at least two hydroxyl functional organic materials having average hydroxy functionalities of from 1.5 to 3 and having number average molecular weights of 4000 or more, with the average hydroxyl functionality of component d) being from about 2 to about 3 and with the average molecular weight of component d) being from about 4000 to about 6000.

The reaction mixture is processed as a one-shot system at an isocyanate index of from about 70 to about 130.

The polyisocyanate useful herein is a liquid, room temperature stable, polyisocyanate having an isocyanate group content of from 15 to 25% by weight and being prepared by reacting:
  1) an isocyanate mixture comprising:
    i) from 80 to 95% by weight of 4,4'-diphenylmethane diisocyanate,
    ii) from 2 to 7% by weight of 2,4'-diphenylmethane diisocyanate, and
    iii) an amount of an isocyanate containing higher oligomers of diphenylmethane diisocyanate having an isocyanate functionality of more than 2, such that the total isocyanate mixture 1) has an average isocyanate functionality of from 2.02 to 2.50, and
  2) a polyol mixture comprising i) one or more diols having number average molecular weights of from 1000 to 5000, 2) one or more triols having number average molecular weights of from 1000 to 6000, wherein the weight ratio of diol to triol is from 10:1 to 1:10.

The individual components of the isocyanate mixture 1) are known in the art. As is known, polymethylene poly (phenyl isocyanates) are prepared by aniline-formaldehyde condensation followed by phosgenation. As is known in the art, the relatively pure diisocyanate isomers are obtained by distilling the resultant polymethylene poly(phenyl isocyanate). Upon distillation, the distillate consists largely of the 4,4'-isomer with a smaller amount of the 2,4'-isomer, and with relatively small or trace amounts of the 2,2'-isomer. By further refining techniques known in the art, it is possible to obtain isomer mixtures having varied ratios of the 4,4'- and 2,4'-isomers. Known processes for preparing such isocyanates are described, e.g., in U.S. Pat. Nos. 2,683,730, 2,950,263, 3,012,008, 3,344,162 and 3,362,979.

It is critical to the present invention that the isocyanate mixture 1) have an average isocyanate functionality of from 2.02 to 2.50 (and preferably from 2.05 to 2.20). This average functionality is attained by adding isocyanates based upon diphenylmethane diisocyanates which have isocyanate functionalities higher than 2. Such higher functional isocyanates are known in the art and include polymethylene poly(phenyl isocyanates) (which are prepared by the phosgenation of aniline-formaldehyde condensation products) and so-called "modified" isocyanates. The modified isocyanates useful herein include carbodiimidized diphenylmethane diisocyanate (see, e.g., U.S. Pat. Nos. 3,152,162, 3,384,653, and 3,449,256, German Offenlegungsschrift 2,537,685); polyisocyanates containing allophanate groups (see, e.g., British Patent 993,890, Belgian Patent 761,626 and published Dutch Application 7,102,524); polyisocyanates containing isocyanurate groups (see, e.g., U.S. Pat. No. 3,001,973, German Patents 1,022,789, 1,222,067, and 1,027,294 and German Offenlegungschriften 1,929,034 and 2,004,408); and polyisocyanates containing biuret groups (see, e.g., U.S. Pat. Nos. 3,124,605 and 3,201,372 and British patent 889, 050). Thus, in the preferred embodiment, the higher functional isocyanates are selected from the group consisting of polymethylene poly(phenyl isocyanates), carbodiimide group-containing polyisocyanates, allophanate group-containing polyisocyanates, isocyanurate group-containing polyisocyanates, biuret group-containing polyisocyanates, and mixtures thereof. Presently, the most preferred higher functional isocyanates are polymethylene poly(phenyl isocyanates).

The diols and triols used to produce the polyisocyanates used in the present invention are known in the polyurethane art. They include polyesters, polyethers, polythioethers, polyacetals, and polycarbonates. Polyethers are presently preferred. The polyethers diols and triols may be obtained, for example, by polymerizing epoxides such as ethylene oxide, propylene oxide, butylene oxide, tetrahydrofuran, styrene oxide, or epichlorohydrin in the presence of $BF_3$ or by chemically adding these epoxides, preferably ethylene oxide and propylene oxide, in admixture or successively to components containing reactive hydrogen atoms such as water or alcohols, or amines. Examples of suitable alcohols include ethylene glycol, 1,2- and 1,3-propanediol, 1,3- and 1,4- and 2,3-butanediol, 1,6-hexanediol, 1,10- decanediol, diethylene glycol, triethylene glycol, tetraethylene glycol, dipropylene glycol, tripropylene glycol, glycerol, and trimethylolpropane. The presently preferred polyether diol is based upon propylene glycol and propylene oxide. The presently preferred polyether triol is based upon glycerol, propylene oxide and ethylene oxide.

The polyol components (i.e., components b), c) and d)) are known in the art. In order to attain the combined result of a high flex modulus and a high elongation, the specific polyol mixture described must be used. The required polyol components are:

b) at least two hydroxy-functional polyethers having average hydroxyl functionalities of from 1.5 to 8 and number average molecular weights of from 350 to below 1800, with the average hydroxyl functionality of component b) being from about 2 to about 4 and with the average molecular weight of component b) being from about 350 to about 500 (throughout the remainder of this description, this component will be referred to as "intermediate molecular weight polyol"), c) at least one hydroxyl functional organic material containing from 2 to 8 hydroxyl groups and having a number average molecular weight below 350 (throughout the remainder of this description, this component will be referred to as "low molecular weight polyol"), wherein components b) and c) are used in a weight ratio of from about 10:1 to about 1:1, and d) from 45 to 60% by weight, based upon the total amount of components b), c) and d) of at least two hydroxyl functional organic materials having average hydroxy functionalities of from 1.5 to 3 and having number average molecular weights of 4000 or more, with the average hydroxyl functionality of component d) being from about 2 to about 3 and with the average molecular weight of component d) being from about 4000 to about 6000 (throughout the remainder of this description, this component will be referred to as "high molecular weight polyol").

The intermediate molecular weight polyols useful herein are known in the art.

A mixture of at least two hydroxy-functional polyethers having average hydroxyl functionalities of from 1.5 to 8 and number average molecular weights of from 350 to below 1800 is used. The mixture must have an average hydroxyl functionality of from about 2 to about 4 and must have an average molecular weight of from about 350 to about 500. Substantially any polyether within the above parameters can be used. It is preferred, however, that only polyethers containing form two to four hydroxy groups be used. Useful polyethers are known and are obtained, for example, by the polymerization of epoxides, such as ethylene oxide, propylene oxide, butylene oxide, tetrahydrofuran, styrene oxide or epichlorohydrin alone, for example in the presence of $BF_3$, or by the chemical addition of these epoxides, optionally in admixture with or in succession to starter components having reactive hydrogen atoms. Such starter compounds include water, alcohols, or amines, such as ethylene glycol, 1,3- or 1,2-propylene glycol, trimethylol propane glycerine, 4,4'-dihydroxy diphenyl propane, aniline, ammonia, ethanolamine and ethylene diamine.

The low molecular weight polyols useful herein are also known in the art. The low molecular weight polyol must consist of at least one hydroxyl functional organic material containing from 2 to 8 hydroxyl groups and having a number average molecular weight below 350. These materials preferably contain 2 or 3 hydroxyl groups. Mixtures of different compounds containing at least two hydroxyl groups and having molecular weight of less than 350 may also be used. Examples of such low molecular weight polyols are ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis-hydroxymethyl cyclohexane, 2-methyl-1,3-propane diol, dibromobutene diol (U.S. Pat. No. 3,723,392), glycerol, trimethylol propane, 1,2,6-hexane triol, trimethylol ethane, pentaerythritol-quinitol, mannitol, sorbitol, diethylene glycol, triethylene glycol, tetraethylene glycol, higher polyethylene glycols having molecular weights of less than 350, dipropylene glycol, higher polypropylene glycols having molecular weights of less than 350, dibutylene glycol, higher polybutylene glycols having a molecular weight of less than 350, 4,4'-dihydroxy diphenyl propane, dihydroxy methyl hydroquinone, and the like.

Other low molecular weight polyols having a molecular weight of less than 350 which may be used in accordance with the present invention are ester diols, diol urethanes and diol ureas. Suitable ester diols correspond to the general formula

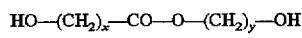

and

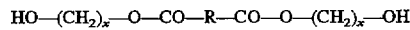

wherein

R represents an alkylene radical containing from 1 to 10, (preferably from 2 to 6) carbon atoms or a cycloalkylene or arylene radical containing from 6 to 10 carbon atoms;

x represents 2 to 6; and y represents 3 to 5.

Examples of compounds corresponding to these formulae are δ-hydroxybutyl-ε-hydroxycaproic acid ester, ω-hydroxy-hexyl-γ-hydroxy butyric acid ester, adipic acid-bis-(β-hydroxyethyl)-ester and terephthalic acid-bis-(β-hydroxy-ethyl)-ester.

Diol urethanes which may be used in the present invention correspond to the general formula:

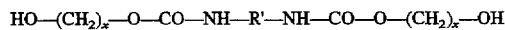

wherein

R' represents an alkylene radical containing from 2 to 15 (preferably from 2 to 6) carbon atoms or a cycloalkylene or arylene radical containing from 6 to 15 carbon atoms, and x represents a number of from 2 to 6.

Examples of such diol urethanes are 1,6-hexamethylene-bis-(hydroxybutyl urethane) and 4,4'-diphenylmethane-bis-(-hydroxybutyl urethane). Diol ureas suitable to the present invention correspond to the general formula:

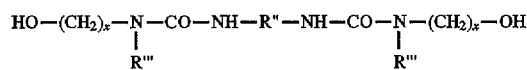

wherein

R" represents an alkylene radical containing from 2 to 15 (preferably from 2 to 9) carbon atoms or a cycloalkylene or arylene radical containing from 6 to 15 carbon atoms, R'" represents hydrogen or a methyl group, and x represents the number 2 or 3

Examples of such diol ureas are 4,4'-diphenylmethane-bis-(β-hydroxyethyl urea) and the compound

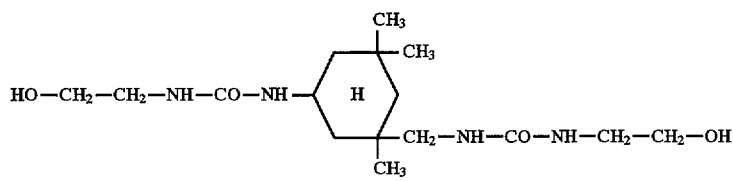

For certain purposes, it may be advantageous to use polyols containing sulfonate and/or phosphonate groups (German Offenlegungsschrift No. 2,719,372), such as the adduct of bisulfite with 1,4-butene diol or the alkoxylation product thereof.

Component d) comprises at least two different hydroxy functional organic materials having average hydroxyl functionalities of from 1.5 to 3 and having number average molecular weights of 4000 or more. The average hydroxyl functionality of Component b) is from about 2 to about 3 and the average molecular weight of component d) is from about 4000 to about 6000, Examples of suitable high molecular weight polyols include the polyesters, polyethers, polythioethers, polyacetals and polycarbonates containing at least 2, preferably 2 to 4 and most preferably 2 to 3 hydroxyl groups of the type known for the production of polyurethanes.

The high molecular weight polyethers suitable for use in accordance with the invention are known and may be obtained, for example, by polymerizing epoxides such as ethylene oxide, propylene oxide, butylene oxide, tetrahydrofuran, styrene oxide, or epichlorohydrin in the presence of $BF_3$ or by chemically adding these epoxides, preferably ethylene oxide and propylene oxide, in admixture or successively to components containing reactive hydrogen atoms such as water, alcohols, or amines. Examples of alcohols and amines include the low molecular weight polyols described above, 4,4'-dihydroxy-diphenylpropane, sucrose, aniline, ammonia, ethanolamine, and ethylene diamine. It is sometimes preferred to use polyethers which contain substantial amounts of primary hydroxyl groups in terminal positions (up to 90% by weight, based on all of the terminal hydroxyl groups present in the polyether). Polyethers modified by vinyl polymers, of the type formed, for example, by polymerizing styrene or acrylonitrile in the presence of polyether (U.S. Pat. Nos. 3,383,351, 3,304,273, 3,523,093, and 3,110,695; and German Patent 1,152,536), are also suitable, as are polybutadienes containing OH groups.

In addition, polyether polyols which contain high molecular weight polyadducts or polycondensates in finely dispersed form or in solution may be used. Such modified polyether polyols are obtained when polyaddition reactions (e.g., reactions between polyisocyanates and amino functional compounds) or polycondensation reactions (e.g., between formaldehyde and phenols and/or amines) are directly carried out in situ in the polyether polyols.

Suitable examples of high molecular weight polyesters include the reaction products of polyhydric, preferably dihydric alcohols (optionally in the presence of trihydric alcohols), with polyvalent (preferably divalent) carboxylic acids. Instead of using the free carboxylic acids, it is also possible to use corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted (for example, by halogen atoms). The polycarboxylic acids and polyols used to prepare the polyesters are known and described, for example, in U.S. Pat. Nos. 4,098,731 and 3,726,952, herein incorporated by reference in their entirety. Suitable polythioethers, polyacetals, polycarbonates, and other polyhydroxyl compounds are also disclosed in the above-identified U.S. patents. Finally, representatives of the many and varied compounds which may be used in accordance with the invention may be found for example in High Polymers, Volume XVI, "Polyurethanes, Chemistry and Technology," by Saunders and Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-H öchtlen, Carl Hanser Verlag, Munich, 1966, pages 45–71.

Other materials which can be included in the reaction mixture included any of the materials generally used in the RIM art.

Reinforcing fillers, which allow reduced contraction of the molded product upon cooling, as well as adjustment of tensile modulus and flex modulus, can also be used and are well known in the art. In fact, in order to reach the highest flex modulus, reinforcing fillers are required.

The reinforcing mats useful in this invention comprise glass mats, graphite mats, polyester mats, polyaramide mats such as KEVLAR mats and mats made from any fibrous material. Although the particular mats used in the examples are random continuous strand mats made of glass fiber bundles, woven mats and oriented mats such as uniaxial or triaxial mats may also be used.

Suitable inorganic fillers also include glass in the form of fibers or flakes, mica, wollastonite, carbon black, talc, calcium carbonate, and carbon fibers. Organic fillers, although less preferred, are also suitable.

Other additives which may be used in the present invention include catalysts, especially tin(II) salts of carboxylic acids, dialkyltin salts of carboxylic acids, dialkyltin mercaptides, dialkyltin dithioesters, and tertiary amines. Preferred among these catalysts are dibutyltin dilaurate and 1,4-diazabicyclo[2.2.2]octane (triethylene diamine), especially mixtures of these catalysts. The catalysts are generally used in amounts of about 0.01 to 10% (preferably about 0.05 to 2%), based on the weight of the high molecular weight component.

It is also possible to use surface-active additives such as emulsifiers and foam stabilizers. Examples include siloxanes, N-stearyl-N',N'-bis-hydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxyethyl imidazole derivative of oleic acid, N-stearyl propylene diamine, and the sodium salts of castor oil sulfonates or of fatty acids. Alkali metal or ammonium salts of sulfonic acid, such as dodecylbenzenesulfonic acid or dinaphthylmethanesulfonic acid, and fatty acids may also be used as surface-active additives. Particularly suitable surface-active compounds include polyether siloxanes of the type generally known for use in the polyurethane art, such as water-soluble polyether siloxanes. The structure of these siloxanes is generally such that a copolymer of ethylene oxide and propylene oxide is attached to a polydimethylsiloxane functionality. Methods of manufacturing preferred siloxanes are described in U.S. Pat. No. 4,906,721, the disclosure of which is herein incorporated by reference.

It is also possible to use mold release agents, which are compounds that are added to the reactive components of the isocyanate addition reaction, usually the isocyanate-reactive component, to assist in the removal of a polyurethane product from a mold. Suitable mold release agents for the present invention include those based at least in part on fatty acid esters (e.g., U.S. Pat. Nos. 3,726,952, 3,925,527, 4,058, 492, 4,098,731, 4,201,847, 4,254,228, 4,868,224, and 4,954, 537 and British patent 1,365,215); metal and/or amine salts of carboxylic acids, amido carboxylic acids, phosphorus-containing acids, or boron-containing acids (e.g., U.S. Pat. Nos. 4,519,965, 4,581,386, 4,585,803, 4,876,019, 4,895, 879, and 5,135,962); polysiloxanes (e.g., U.S. Pat. No. 4,504,313); amidines (e.g., U.S. Pat. Nos. 4,764,540, 4,789, 688, and 4,847,307); resins prepared by the reaction of isocyanate prepolymers and a polyamine-polyimine component (e.g., U.S. Pat. No. 5,198,508); neutralized esters prepared from certain amine-started tetrahydroxy compounds described in U.S. Pat. No. 5,208,268; and aliphatic polyalkylene and polyalkadienes.

In addition to the reinforcement fillers, catalysts, surface-active agents, and mold release agents mentioned above, other additives which may be used in the molding compositions of the present invention include known fillers of other types, blowing agents, cell regulators, flame retarding agents, plasticizers, and dyes of the types generally known in the art.

The compositions according to the present invention are especially suited for processing by the RIM process. In general, two separate streams are intimately mixed and subsequently injected into a suitable mold, although it is possible to use more than two streams. The first stream contains the polyisocyanate component, whereas the second stream contains the isocyanate-reactive components, any internal mold release agent, and any other additives which are to be included.

The quantity of polyisocyanate used in the process according to the present invention is preferably calculated so that the reaction mixture has an isocyanate index of from 70 to 130 (preferably from 90 to 110). By "isocyanate index" is meant the quotient of the number of isocyanate groups and number of groups which are reactive with isocyanates, multiplied by 100.

The known RIM process is used for carrying out the process according to the present invention. In general, the components may be mixed simultaneously, or the non-reactive components may be pre-mixed and then mixed with the reactive components. A starting temperature of from 10° to 70° C. (preferably from 30° to 50° C.) is generally chosen for the mixture introduced into the mold. The temperature of the mold itself is generally from 40° to 100° C. (preferably from 50° to 70° C.). After completion of the reaction and molding process, the resultant product is removed from the mold.

The following examples further illustrate details for the process of this invention. Unless otherwise noted, all temperatures are degrees Celsius and all parts and percentages are parts by weight and percentages by weight, respectively.

EXAMPLES

In the examples, the following materials were used:

Intermediate molecular weight polyols

POLYOL A: a 425 molecular weight polyether diol from propylene glycol and propylene oxide.

POLYOL D: an ethylene diamine/propylene oxide adduct having a molecular weight of 350.

POLYOL E: a monoethanolamine/propylene oxide adduct having a molecular weight of about 480.

Low molecular weight polyol

EG: ethylene glycol

High molecular weight polyols

POLYOL B: a 6000 molecular weight polyether triol prepared by reacting glycerin with propylene oxide and then ethylene oxide (weight ratio of PO to EO of about 5 to 1) and containing about 90% primary hydroxy groups.

POLYOL C: a 4000 molecular weight polyether diol prepared by reacting propylene glycol with propylene oxide and then ethylene oxide (weight ratio of PO to EO of about 4 to 1) and containing about 90% primary hydroxy groups POLYOL F: a 4800 molecular weight polyether triol prepared by reacting glycerin with propylene oxide and then ethylene oxide (weight ratio of PO to EO of about 7 to 1) and containing about 85% primary hydroxy groups.

Isocyanates

ISOCYANATE A: The isocyanate was prepared as follows: A reaction vessel was first heated to about 50° C. 12 parts by weight of a diphenylmethane diisocyanate-based polyisocyanate (having an isocyanate group content of 32.6 and an average isocyanate functionality of 2.29 and consisting of 16% by weight 2,4'-diphenylmethane diisocyanate, 56% by weight 4,4'-diphenylmethane diisocyanate, and 28% by weight higher oligomers of diphenylmethane diisocyanate), and 52 parts by weight of a diphenylmethane diisocyanate (about 98% 4,4'-diphenylmethane diisocyanate and 2% 2,4'-diphenylmethane diisocyanate) were then added to the vessel. 18 parts by weight of a glycerin initiated polyether polyol of 4800 molecular weight and a PO/EO weight ratio of about 5:1) and 18 parts by weight of a propylene glycol started polyether polyol of molecular weight 2000 were then added and the mixture was heated with agitation. The reaction mixture was held at 65° to 70° C. until the reaction was complete (about two hours). The completion of the reaction was determined by measurement of the % NCO of the reaction product. The reaction was considered complete once the % NCO equalled the theoretical % NCO based upon the amounts of reactants. The resultant product had an NCO content of about 20% by weight.

ISOCYANATE B: a 50/50 mixture of i) a commercially available isocyanate having an NCO content of about 22.5% by weight, prepared by reacting tripropylene glycol with a mixture of 98% 4,4'-diphenylmethane diisocyanate and 2% 2,4'-diphenylmethane diisocyanate (Mondur PF), and ii) a commercially available polymethylene poly(phenyl isocyanate) having an NCO content of about 32% by weight and having a diisocyanate content of about 48% by weight (Mondur MR).

ISOCYANATE C: a commercially available uretone imine-modified diphenylmethane diisocyanate having an NCO content of about 29.5% by weight (Mondur CD). This isocyanate is equivalent to the isocyanate used in the examples of U.S. Pat. No. 4,385,133.

Other materials

OA: oleic acid

PC-15: Polycat 15, an amine catalyst commercially available from Air Products.

SA-610: an acid-blocked 1,5-diazodicyclo(5.4.0)undec-5-ene delayed action catalyst, commercially available from Air Products.

Procedure

Examples 1 through 6 were performed using a small Hennecke HK-245 RIM machine, while Examples 7 and 8 were performed using a Rimdomat 3000 machine. The materials were blended in sufficient quantities to flush the particular machine used. After flushing, the mix pressures were set at 2200 psi for both A and B sides. The A side was the isocyanate and the B side contained all other raw materials noted in Table 1. (The amounts appearing in the rows designated "A SIDE" and "B SIDE" are the parts by weight of the A Side and the B side.) A 15 inch by 15 inch by 0.125 inch metal plaque mold was used. The mold was heated to 180° F. and was cleaned with a commercial mold cleaner (Chemtrend 201-B). A light coat of commercial mold release (Chemtrend CT-2006) was applied to the internal surface of the mold. Several parts were made without any reinforcement to obtain "neat" physical properties. Then five layers of Owens Corning Fiberglass (8610 continuous strand mat in 2 oz. per square foot size) were placed in the mold. The glass content was as noted in Table 1. The mold was closed and the reaction mixture was injected. Both the A side and B side were maintained at about 90° F. Demold was in about two minutes. The parts were then tested. The formulations tested were as indicated in Table 1, while the test results were as indicated in Table 2. All parts in Table 1 are parts by weight, unless otherwise indicated. In Table 1, only Example 3 falls within the scope of the present invention. The rest of the examples are comparative examples as follows:

Example 1: the amount of high molecular weight polyol was too low and only one high molecular weight polyol was used;

Example 2: the isocyanate was not according to the present invention;

Example 4: the amount of high molecular weight polyol was too low;

Example 5: the amount of high molecular weight polyol was too high;

Example 6: only one intermediate molecular weight polyol was used;

Example 7: only one high molecular weight polyol was used; and

Example 8: the isocyanate was not according to the present invention.

The following ASTM tests were used:

Density—ASTM D-1622

Flexural Modulus—ASTM D-790

5 mph Dart Impact, Total Energy—ASTM D-3763-86

TABLE 1

| Example | 1 | 2 | 3 | 4 | 5 | 6 | 7 | 8 |
|---|---|---|---|---|---|---|---|---|
| A SIDE | 100 | 100 | 100 | 100 | 100 | 100 | 100 | 100 |
| ISO A | 100 | — | 100 | 100 | 100 | 100 | 100 | — |
| ISO B | — | 100 | — | — | — | — | — | — |
| ISO C | — | — | — | — | — | — | — | 100 |
| B SIDE | 237 | 108 | 146 | 227 | 94 | 146 | 146 | 146 |
| POLYOL A | 29 | 20 | 20 | 25 | 15 | — | 20 | 20 |
| POLYOL B | 25 | 25 | 25 | 15 | 35 | 25 | — | 25 |
| POLYOL C | — | 25 | 25 | 15 | 30 | 25 | — | 25 |
| POLYOL D | 24 | 20 | 20 | 25 | 15 | — | 20 | 20 |
| POLYOL E | — | — | — | — | — | 40 | — | — |
| POLYOL F | — | — | — | — | — | — | 50 | — |
| EG | 22 | 10 | 10 | 20 | 5 | 10 | 10 | 10 |
| PC-15 | 0.35 | 0.5 | 0.5 | 0.5 | 0.5 | 0.5 | 0.5 | 0.5 |
| SA-610 | 1.5 | 1 | 1 | 1 | 1 | 1 | 1 | 1 |
| % by weight, glass | 62 | 59 | 59 | 57 | 57 | 58 | 58 | 59 |
| Isocyanate index | 105 | 105 | 105 | 105 | 105 | 105 | 105 | 105 |

TABLE 2

| Example | Density, neat, #/ft³ | Impact, neat, ft-lb | Flex modulus, psi |
|---|---|---|---|
| 1 | 72.5 | 22.9 | 1,314,000 |
| 2 | 70.9 | 8.5 | 1,424,000 |
| 3 | 70.6 | 30.1 | 1,012,000 |
| 4 | 70.5 | 20.8 | 1,117,467 |
| 5 | 70.4 | 26.2 | 595,933 |
| 6 | 71.0 | 19.5 | 853,600 |
| 7 | 70.7 | 15.6 | 924,000 |
| 8 | 70.8 | 10.6 | 1,525,200 |

It has been found that the better (i.e., the higher) the neat impact results, the less crack propagation in bumper beam testing. In other words, the higher the neat impact, the higher the elongation of the unreinforced product.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the production of polyurethane moldings by reacting a reaction mixture in a closed mold, the improvement wherein the reaction mixture comprises:

a) a liquid, room temperature stable, polyisocyanate having an isocyanate group content of from 15 to 25% by weight and having been prepared by reacting:
   1) an isocyanate mixture comprising:
      i) from 80 to 95% by weight of 4,4'-diphenylmethane diisocyanate,
      ii) from 2 to 7% by weight of 2,4'-diphenylmethane diisocyanate, and
      iii) an amount of an isocyanate containing higher oligomers of diphenylmethane diisocyanate having an isocyanate functionality of more than 2, such that isocyanate mixture 1) has an average isocyanate functionality of from 2.02 to 2.50, and
   2) a polyol mixture comprising:
      i) one or more diols having molecular weights of from 1000 to 5000, and
      ii) one or more triols having molecular weights of from 1000 to 6000, wherein the weight ratio of diol to triol is from 10:1 to 1:10, b) at least two hydroxy-functional polyethers having average hydroxyl functionalities of from 1.5 to 8 and number average molecular weights of from 350 to below 1800, with the average hydroxyl functionality of component b) being from about 2 to about 4 and with the average molecular weight of component b) being from about 350 to about 450, c) at least one hydroxyl functional organic material containing from 2 to 8 hydroxyl groups and having a number average molecular weight below 350, wherein components b) and c) are used in a weight ratio of from about 10:1 to about 1:1, and d) from 45 to 60% by weight, based upon the total amount of components b), c) and d) of at least two hydroxyl functional organic materials having average hydroxy functionalities of from 1.5 to 3 and having number average molecular weights of 4000 or more, with the average hydroxyl functionality of component d) being from about 2 to about 3 and with the average molecular weight of component d) being from about 4000 to about 6000, with the amounts of components a), b), c) and d) being such the reaction mixture has an isocyanate index of from 70 to 130.

2. The product of the process of claim 1.

* * * * *